(12) United States Patent
Malis et al.

(10) Patent No.: US 7,994,901 B2
(45) Date of Patent: Aug. 9, 2011

(54) LUG STUD AND LUG NUT MONITORING SYSTEM, METHOD, AND COMPONENTS THEREFOR

(75) Inventors: Craig Steven Malis, South Lyon, MI (US); Douglas James Calaman, Clarkston, MI (US)

(73) Assignee: Tag Blue L.L.C., Livonia, MI (US)

( * ) Notice: Subject to any disclaimer, the term of this patent is extended or adjusted under 35 U.S.C. 154(b) by 658 days.

(21) Appl. No.: 12/032,890

(22) Filed: Feb. 18, 2008

(65) Prior Publication Data

US 2009/0207008 A1 Aug. 20, 2009

(51) Int. Cl.
*B60R 25/10* (2006.01)

(52) U.S. Cl. ......... 340/426.33; 340/438; 411/8; 411/14; 301/35.621; 301/35.623; 301/37.21

(58) Field of Classification Search ............. 340/426.33, 340/450–451, 686.1, 426.27, 442–448, 539.15; 301/35.623–35.625, 37.374, 37.375, 37.21; 411/8–14; 73/761
See application file for complete search history.

(56) References Cited

U.S. PATENT DOCUMENTS

| | | | |
|---|---|---|---|
| 2,600,029 A | 11/1946 | Stone | |
| 3,383,974 A | 5/1968 | Dahl | |
| 3,602,186 A * | 8/1971 | Popenoe | 411/13 |
| 3,799,108 A * | 3/1974 | Mosow | 411/13 |
| 3,823,639 A | 7/1974 | Liber | |
| 3,850,133 A | 11/1974 | Johnson | |
| 3,954,004 A * | 5/1976 | Orner | 73/761 |
| 4,151,655 A * | 5/1979 | Makarainen | 33/203.18 |
| 4,569,229 A * | 2/1986 | de Halleux | 73/597 |
| 4,709,654 A * | 12/1987 | Smith | 116/283 |
| 4,823,606 A | 4/1989 | Malicki | |
| 5,088,867 A * | 2/1992 | Mun | 411/13 |
| 5,222,849 A | 6/1993 | Walton | |
| 5,226,765 A | 7/1993 | Walton | |
| 5,552,759 A * | 9/1996 | Stoyka | 340/426.33 |
| 5,584,627 A | 12/1996 | Ceney | |
| 5,646,593 A * | 7/1997 | Hughes et al. | 340/573.1 |
| 6,204,771 B1 | 3/2001 | Ceney | |
| 6,533,514 B2 | 3/2003 | Fischer | |
| 6,609,865 B2 | 8/2003 | Daigneault | |
| 6,843,628 B1 * | 1/2005 | Hoffmeister et al. | 411/14 |
| 7,012,511 B2 * | 3/2006 | Hayes | 340/438 |
| 7,339,464 B2 * | 3/2008 | Russell | 340/505 |
| 7,412,898 B1 * | 8/2008 | Smith et al. | 73/761 |
| 2003/0102976 A1 * | 6/2003 | Lavallee | 340/687 |
| 2006/0263166 A1 | 11/2006 | Kelly | |
| 2008/0131228 A1 * | 6/2008 | Sheets | 411/14 |
| 2008/0253858 A1 * | 10/2008 | Hsieh | 411/14 |

* cited by examiner

*Primary Examiner* — Daniel Wu
*Assistant Examiner* — Ryan Sherwin
(74) *Attorney, Agent, or Firm* — Honigman Miller Schwartz and Cohn LLP

(57) ABSTRACT

A lug stud and lug nut monitoring system, method, and components for a vehicle may have a lug stud, a lug nut, at least one sensor, and an indicator. The lug stud has a shank. The lug nut is constructed to fasten on the shank. The sensor can be carried by the lug stud, by the lug nut, or by both the lug stud and the lug nut. The sensor takes at least one measurement. The indicator communicates with the sensor in order to determine a value based on the measurement, and to alert an operator of the vehicle if and when the value reaches a predetermined relationship to a reference value.

12 Claims, 2 Drawing Sheets

LUG STUD AND LUG NUT MONITORING SYSTEM, METHOD, AND COMPONENTS THEREFOR

TECHNICAL FIELD

The subject invention generally relates to vehicle wheels, and more particularly to systems, methods, and components used to monitor lug studs and lug nuts.

BACKGROUND

Vehicle wheel rims are commonly mounted to a hub by lug nuts fastened down on an equal number of lug studs. Sometimes the lug nuts come loose; sometimes they were never properly tightened to begin with; or sometimes they are too tight. Having a way to remotely alert a driver of these conditions may be helpful.

SUMMARY OF THE INVENTION

According to one conception of the invention, a vehicle lug stud and lug nut monitoring system may include a lug stud, a lug nut, at least one sensor, and an indicator. The lug stud has a shank. The lug nut is constructed to fasten on the shank. The sensor is carried by the lug stud, by the lug nut, or by both the lug stud and the lug nut. The sensor takes at least one measurement. The indicator communicates with the sensor in order to determine a value that is based on the at least one measurement, and in order to alert an operator of the vehicle if and when the value reaches a predetermined relationship with respect to a reference value.

According to another conception of the invention, a vehicle lug stud and lug nut monitoring system may include a lug stud, a lug nut, a sensor, and an indicator. A lug stud has a shank that defines a cavity, and a fluid is disposed in the cavity. The lug nut is constructed to fasten on the shank. The sensor is carried by the lug stud in order to measure at least one force that is exerted by the fluid over a predetermined time. The indicator communicates with the sensor in order to determine a value that is based on the at least one measurement and in order to alert an operator of the vehicle if and when the value reaches a predetermined relationship with respect to a reference value.

According to yet another conception of the invention, a vehicle lug stud and lug nut monitoring system may include a lug stud, a lug nut, at least one sensor, and an indicator. The lug stud has a shank, and the lug nut is constructed to fasten on the shank. The sensor is carried by the lug stud, by the lug nut, or by both the lug stud and the lug nut. The sensor measures a distance extending between the lug stud and the lug nut. The indicator communicates with the sensor in order to determine a value that is based on the measured distance, and in order to alert an operator of the vehicle if and when the value reaches a predetermined relationship with respect to a reference value.

According to still another conception of the invention, a method of monitoring a lug stud and a lug nut on a vehicle wheel may include the step of taking at least one measurement that results from a condition between the lug stud and the lug nut. The method may also include determining a value that is based on the at least one measurement. And the method may include alerting an operator of the vehicle if and when the value reaches a predetermined relationship with respect to a reference value.

According to yet another conception of the invention, a vehicle lug stud and lug nut monitoring system may include a lug stud, a lug nut, at least one sensor, a radio frequency transmitter, a radio frequency receiver, a control module, a display, and a power source. The lug stud has a head and an externally threaded shank. The lug nut has internal threads to fasten on the shank. The sensor can be carried by the lug stud, by the lug nut, or by both the lug stud and the lug nut. The sensor takes at least one measurement. The radio frequency transmitter communicates with the sensor in order to emit a signal in response to the measurement. The radio frequency receiver receives the signal from the radio frequency transmitter. The control module communicates with the radio frequency receiver in order to determine a value that is based on the measurement. The display alerts an operator of the vehicle if and when the value reaches a predetermined relationship with respect to a reference value. And the power source supplies power to at least the sensor and to the radio frequency transmitter.

According to still another conception of the invention, a lug stud for a vehicle lug stud and lug nut monitoring system may include a head, a shank, a fluid, a sensor, and a radio frequency transmitter. The shank is externally threaded and extends from the head, and defines a cavity. The fluid is sealed in the cavity. The sensor is in contact with the fluid in order to sense forces that are exerted by the fluid. And the radio frequency transmitter is in communication with the sensor in order to emit a signal in response to the sensor.

According to yet another conception of the invention, a vehicle lug stud and lug nut monitoring system may include a lug stud, a lug nut, a sensor, a magnet, and an indicator. The lug stud has a shank, and the lug nut is constructed to fasten on the shank. The sensor can be carried by the lug stud, and the magnet can be carried by the lug nut. And the indicator can alert an operator of the associated vehicle when and if the sensor no longer detects a magnetic field that is generated by the magnet.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
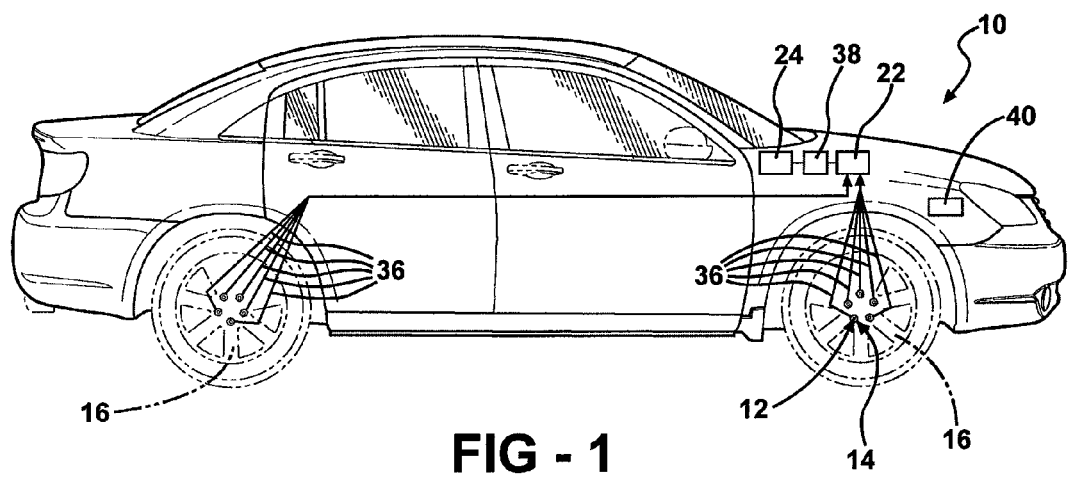
FIG. 1 shows an embodiment of a lug stud and lug nut monitoring system as it may be equipped in a vehicle.

Referring now to the drawings, FIGS. 1-4 show example embodiments of a lug stud and lug nut monitoring system and method, generally shown at 10, that monitors each lug stud, generally indicated at 12, and each lug nut, generally indicated at 14. The monitoring system 10 can, in some cases, detect a torque between the lug stud 12 and the lug nut 14 and can remotely alert an operator of the associated vehicle if the lug nut is undertorqued (e.g., loose or not torqued enough) and if the lug nut is overtorqued (e.g., torqued too much). The monitoring system 10 may be equipped as original equipment or retrofitted on all vehicle wheels 16 of an automobile, a semi-truck, or the like. In one example embodiment, the monitoring system 10 may include the lug stud 12, the lug nut 14, a sensor 18, an indicator, and a power source 40.

Figure 2:
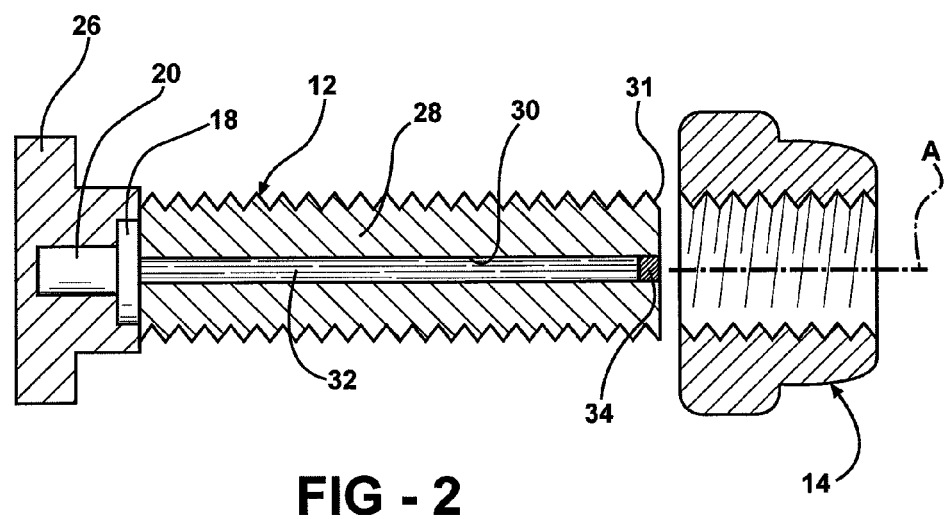
FIG. 2 shows a cross-section of an embodiment of a lug stud and a lug nut for use with the system of FIG. 1.

A plurality of lug studs 12 is used with the lug nuts 14 to mount the vehicle wheel 16 on the associated vehicle hub. Referring to FIG. 2, an example lug stud 12 may have a head 26 designed to receive a wrench (not shown) and designed to accommodate other components such as the sensor 18 if need be, and may have a shank 28 designed for fastening with the lug nut 14. In some cases, the head 26 may be a unitary extension of the associated hub, or may be a separate piece. As shown, the shank 28 is externally threaded and defines an internal cavity in the form of a bore 30. The bore 30 may be drilled along a center axis A of the shank 28 to extend approximately the full length of the shank from the head 28 to a terminal on free end 31 as shown, but may extend from the free end 31 only a distance subjected to fastening by the lug nut 14 when the lug nut is mounted on the respective vehicle wheel 16. The bore 30 may be coated with a coating to cover any slight imperfections that may be present on the surface of the drilled bore. A fluid, such as an incompressible fluid 32, may completely fill the bore 30, and may be sealed in the bore by a polymer seal 34, a stop, or other suitable sealant. Examples of suitable incompressible fluids include castor oil, brake fluid (glycol DOT4), or the like. In some embodiments, the fluid may also be a compressible fluid. The lug nut 14 may be an internally threaded lug nut that fastens on the shank 28 of the lug stud 12.

The sensor 18 may be in contact with the bore 30 and the incompressible fluid 32 to monitor, or periodically measure, a force exerted by the incompressible fluid 32 on the sensor—either directly or indirectly. The sensor 18 may be imbedded in, or otherwise carried by, the head 26 as shown, or may be located along the shank 28, or at other positions where the sensor can be in contact with the bore 30, with the incompressible fluid 32, or with both. The sensor 18 transmits, or otherwise generates, an electrical signal to the RF transmitter 20 in response to the force that is measured. The sensor 18 may be any one of numerous types of sensors including pressure sensors that will be known to skilled artisans. A suitable pressure sensor may be determined by factors including, among other factors, thermal resistance, shock resistance, size, and cost. One type is a piezoresistive pressure sensor that uses a change in conductivity of an integrated semiconductor to measure pressure. Suitable piezoresistive pressure sensors may be provided by Piezo Kinetics of Bellefonte, Pa. USA (www.piezo-kinetics.com), or by Nihon Ceratec Inc. of Santa Clara, Calif. USA.

In this example embodiment, the indicator communicates with the sensor 18 and determines a value that is based on one or more forces that are measured by the sensor, and that are exerted by the incompressible fluid 32. The indicator then alerts the operator of the associated vehicle if and when the value reaches a predetermined relationship with respect to a reference value or values. One example of the predetermined relationship is when the value is outside of—namely above or below—the reference value, indicating that the lug nut 14 may be either undertorqued on the lug stud 12 or overtorqued on the lug stud. The reference value may be a force value that represents an acceptable torque value or range of torque values. In other words, the reference value represents an acceptable torque value resulting from the lug nut 14 being tightened on the lug stud 12 to a degree where the lug nut is neither undertorqued nor overtorqued. The exact reference value or values may be dictated by, among other things, the size of the lug stud and the size of the lug nut. The indicator includes a combination of a number of components, which may include a radio frequency (RF) transmitter 20, an RF receiver 22, a control module 38, and a display 24.

Figure 3:
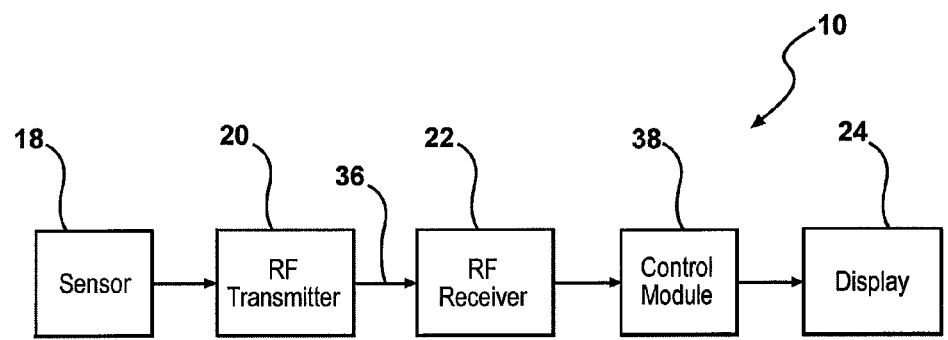
FIG. 3 shows a schematic of the lug stud and lug nut monitoring system of FIG. 1.

Referring to FIGS. 2 and 3, the RF transmitter 20 communicates with the sensor 18 and emits a signal 36 to the RF receiver 22 in response to the sensor. Put differently, the RF transmitter 20 transmits a signal from the sensor 18 and to the RF receiver 22. The signal 36 may be modulated and encoded to transmit data such as the measured force, a unique identifier, or the like. The RF transmitter 20 may be embedded in, or otherwise carried by, the head 26 adjacent the sensor 18 as shown, or may be located along the shank 28, or at other positions where the RF transmitter can communicate with the sensor. The RF transmitter 20 may be any one of numerous types of RF transmitter integrated circuits (ICs) that will be known to skilled artisans, such as low-power flash-microcontroller RF transmitter ICs produced by the Atmel Corporation of San Jose, Calif. USA (www.atmel.com).

Referring to FIGS. 1 and 3, the RF receiver 22 receives the signal 36 from the RF transmitter 20 and, in this example, embodiment, communicates the signal 36 to the control module 38. In other words, the RF receiver 22 relays the signal 36 from the RF transmitter 20 and to the control module 38. As shown, a single RF receiver 22 may be located adjacent to, or otherwise integrated with, the control module 38; in other example embodiments, one RF receiver 22 may be located at each vehicle wheel 16. The RF receiver 22 may be any one of numerous types of RF receiver ICs that will be known to skilled artisans, such as those produced by the Atmel Corporation. In other example embodiments, the RF receiver 22 may be a part of, or packaged with, a vehicle remote keyless entry system or a vehicle tire pressure monitoring system.

The control module 38 may control the monitoring system 10, or may be the component of the monitoring system that makes a determination to establish when the lug nut 14 is undertorqued or overtorqued. The control module 38 may be programmed by software to execute these and other functions; and skilled artisans will know how to program the software in order to do so. The control module 38 may be any one of numerous vehicle electronic control units (ECUs), and may have a microcomputer including a CPU, ROM, RAM, I/O, and the like, in order to execute these and other functions. The display 24 alerts the vehicle operator when the lug nut is undertorqued or overtorqued. The display 24 may be any number of components or methods known to skilled artisans including a warning light on a vehicle instrument panel (not shown), or the like.

Referring to FIG. 1, the monitoring system 10 may be powered by a vehicle battery 40. In one example embodiment, the sensor 18 and the RF transmitter 20 may be powered by the vehicle battery 40, while the other components such as the RF receiver 22 and the display 24 may share power respectively from the control module 38 and the vehicle instrument panel. In another example embodiment, a system battery may be provided that is separate from the vehicle battery 40 and dedicated to powering the lug stud torque monitoring system 10. And still in another example embodiment, a piezoelectric film may be equipped on the lug stud 12 to power the sensor 18 and the RF transmitter 20. Skilled artisans will know that such piezoelectric films can convert movement (e.g., rotation, vibration) of the associated vehicle wheel 16 to electrical power. In short, this process generates electrical power with conductors attached at one end to the piezoelectric film and electrically connected at another end to the sensor 18, to the RF transmitter 20, or to both.

When using this example embodiment, the monitoring system 10 can indirectly establish when the lug nut 14 is undertorqued, when the lug nut 14 is overtorqued, or both. For example, when the lug nut 14 is tightened, or torqued down, on the shank 28, the lug nut exerts mechanical forces, such as a radial force, on the shank. These mechanical forces produce a slight elongation in the shank 28 which squeezes the incompressible fluid 32, which in turn exerts an axial force against the sensor 18. The sensor 18 then reads the resulting pressure (P=F/A) from the axial force. The greater the lug nut 14 is torqued down on the shank 28, the greater the elongation, and thus the greater the resulting pressure. The resulting pressure may then be communicated, or otherwise conveyed as data, to the RF transmitter 20 which in turn sends the signal 36 to the RF receiver 22. The RF receiver 22 then conveys the resulting pressure to the control module 38.

In one example, the monitoring system 10 determines when the value goes outside of the reference value and may be undertorqued. The sensor 18 reads a static force exerted by the incompressible fluid 32, which is a force measurement taken when the lug nut 14 is not tightened on the shank 28, or otherwise not torqued down on the shank. The sensor 18 also reads a working force exerted by the incompressible fluid 32, which is a force measurement taken when the lug nut 14 is tightened on the shank 28, or torqued down on the shank. The control module 38 then calculates a difference ($\Delta F$) between the static force and the working force. The difference is compared to a reference range of differences which serves as a proxy for an acceptable range of torque values, and which has an upper limit and a lower limit. If the difference is below the lower limit, then the monitoring system 10 alerts the vehicle operator through the display 24 of a potential undertorqued condition. In another example, the control module 38 makes a first comparison that compares the working force to a first reference value. The first reference value may represent a lower limit of acceptable torque values exerted by the incompressible fluid 32 of an appropriately tightened lug nut 14 on the shank 28. If the working force is below, or less than, the first reference value, then the display 24 alerts the vehicle operator of a potential undertorqued condition.

In another example, the monitoring system 10 determines when the value goes outside of the reference value and may be overtorqued. Again, the control module 38 calculates the difference between the static force and the working force, and compares the difference to the reference range. Here, if the difference is above the upper limit, then the monitoring system 10 alerts the vehicle operator through the display 24 of a potential overtorqued condition. In another example, the control module 38 makes a second comparison that compares the working force to a second reference value. The second reference value may represent an upper limit of acceptable torque values exerted by the incompressible fluid 32 of an appropriately tightened lug nut 14 on the shank 28. If the working force is above, or greater than, the second reference value, then the display 24 alerts the vehicle operator of a potential overtorqued condition.

In one example, the monitoring system 10 may only determine when the lug nut 14 is undertorqued on the lug stud 12, as opposed to determining when the lug nut is both undertorqued and overtorqued on the lug stud. And all of the above actions may be executed continuously, or periodically where the control module would, for example, execute its functions at timed intervals. So if the lug nut 14 is initially tightened on the shank 28 at an acceptable torque value, and subsequently changes over time to an unacceptable torque value, the indicator would recognize the change and alert the operator appropriately.

Figure 4:
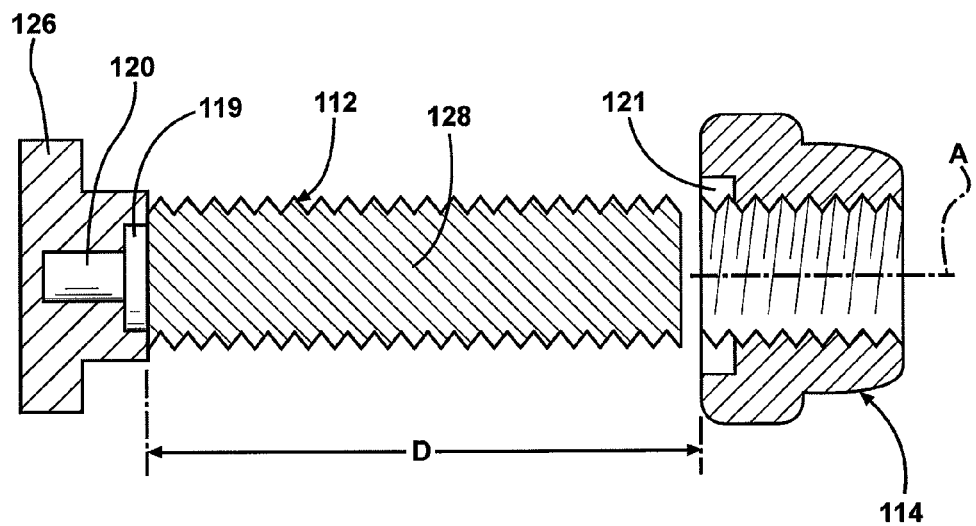
FIG. 4 shows a cross-section of another embodiment of a lug stud and a lug nut for use with the system of FIG. 1.

FIG. 4 shows another example embodiment of a lug stud 112 and a lug nut 114. The lug stud 112 may have a head 126 designed to receive a wrench (not shown) and to accommodate other components such as a first sensor 119 and an RF transmitter 120, if need be. The lug stud 112 may also have an externally threaded shank 128 designed for fastening with the lug nut 114. In some cases, the head 126 may be a unitary extension of the associated hub, or may be a separate piece.

In one example, the first sensor 119 may be used to monitor, or periodically measure, a distance between the lug stud 112 and the lug nut 114. As shown, the first sensor 119 may measure a relative distance D between itself and a second sensor 121. The distance D may be a linear distance parallel to a center axis A of the shank 128. The first sensor 119 may be imbedded in, or otherwise carried by, the head 126, or may be located along the shank 128, or at other positions in the lug stud 112. The second sensor 121, on the other hand, may be imbedded in, or otherwise carried by, the lug nut 114 at any location in the lug nut. The first sensor 119 transmits, or otherwise generates, an electrical signal to the RF transmitter 120 in response to the distance D that is measured. The first sensor 119 may be a mechanical sensor such as a position sensor, and the second sensor 121 may be a target for the first sensor. In either of these cases, the first sensor 119 and the second sensor 121 may be calibrated to have high sensitivity, high precision, and high accuracy in order to measure even slight changes in the distance D.

In this example embodiment, the indicator communicates with the first sensor 119 and determines a value that is based on the measured distance D. The indicator then alerts the operator of the associated vehicle when the value reaches a predetermined relationship with respect to a reference value or values. One example of the predetermined relationship is when the value is outside of—namely above or below—the reference value, indicating that the lug nut 114 may be either undertorqued on the lug stud 112 or overtorqued on the lug stud. The reference value may be a distance value or a range of distance values that represents, or is a proxy for, an acceptable torque value or range of torque values. In other words, the reference value represents an acceptable torque value resulting from the lug nut 114 being tightened on the lug stud 112 to a degree where the lug nut is neither undertorqued nor overtorqued. The indicator may include the same combination of components as previously described.

When using this example embodiment of the lug stud 112 and the lug nut 114, the lug stud torque monitoring system 10 can indirectly establish when the lug nut 114 is undertorqued, when the lug nut 114 is overtorqued, or both. For example, when the lug nut 114 is tightened, or torqued down, on the shank 128, the lug nut 114 moves a distance along the center axis A on the shank. The first sensor 119 measures the distance D as the lug nut 114 is tightened, as the distance D changes, and when the distance D is constant. The greater the lug nut 114 is torqued down on the shank 128, the shorter the distance D. The resulting distance may then be communicated, or otherwise conveyed as data, to the RF transmitter 120 which in turn sends the signal 36 to the RF receiver 22. The RF receiver 22 then conveys the signal to the control module 38.

The control module 38 compares the measured distance D to the reference range of distances when the lug nut 114 is tightened on the lug stud 112. If the distance D is less than a first, or lower limit of the reference range, then the display 24 alerts the vehicle operator of a potential overtorqued condition. And if the distance D is greater than a second, or upper limit of the reference range, then the display 24 alerts the vehicle operator of a potential undertorqued condition.

Another example embodiment includes a Hall-effect arrangement with a Hall-effect sensor 119 and a corresponding magnet 121. The Hall-effect sensor 119 can be composed of a semiconductor material or other suitable material, and can be supplied voltage from the above-described power source. The Hall-effect sensor 119 can be carried by, or imbedded in, either the lug stud 112 or the lug nut 114; and the magnet 121 can respectively be carried by, or imbedded in, either the lug nut 114 or the lug stud 112. In use, the Hall-effect sensor 119 is activated by, or detects, a magnetic field having a sufficient density and a correct orientation that can be generated by the magnet 121. For example, in an ON condition, the Hall-effect sensor 119 detects a magnetic south pole emanating from the magnet 121, and in an OFF condition, the Hall-effect sensor does not detect the magnetic south pole. When the lug nut 114 is located properly on the shank 128, the Hall-effect sensor 119 is in the ON condition, and when the lug nut is not located on the shank (e.g., loosens and falls off the shank), the Hall-effect sensor is in the OFF condition and the operator is alerted. In this example, the monitoring system does not necessarily establish an under-torqued or overtorqued condition, but rather establishes when the lug nut 114 comes loose and falls off of the lug stud 112. Skilled artisans will know the further construction, arrangement, and operation of such Hall-effect sensors and associated components so that a more complete description is not needed here.

The invention has been described in an illustrative manner, and it is to be understood that the terminology that has been used is intended to be in the nature of words of description rather than of limitation.

Obviously, many modifications and variations of the present invention are possible in light of the above teachings. Therefore, it is to be understood that within the scope of the appended claims the invention may be practiced otherwise than as specifically described. Moreover, the reference numerals are merely for convenience and are not intended to be in any way limiting.

We claim:

1. A vehicle lug stud and lug nut monitoring system, comprising:
   a lug stud having a shank;
   a lug nut constructed to fasten on the shank;
   a first sensor carried by the lug stud and a second sensor carried by the lug nut, at least one of the first and second sensors measuring a relative distance between the first and second sensors; and
   an indicator communicating with the at least one measuring sensor to determine a torque value based on the measured relative distance, and to alert an operator of the vehicle when the torque value reaches a predetermined relationship to a reference value.

2. The vehicle lug stud and lug nut monitoring system of claim 1, wherein the at least one measuring sensor measures a linear distance between the lug stud and the lug nut parallel to a center axis defined by the lug stud.

3. The vehicle lug stud and lug nut monitoring system of claim 1, wherein the indicator includes a radio frequency transmitter that communicates with the at least one measuring sensor in order to emit a signal in response to the measured relative distance.

4. The vehicle lug stud and lug nut monitoring system of claim 3, wherein the indicator includes a radio frequency receiver in order to receive the signal from the radio frequency transmitter.

5. The vehicle lug stud and lug nut monitoring system of claim 4, wherein the indicator includes a control module that communicates with the radio frequency receiver in order to determine when the torque value reaches the predetermined relationship to the reference value.

6. The vehicle lug stud and lug nut monitoring system of claim 5, wherein the indicator includes a display on a vehicle instrument panel in order to alert the operator of the vehicle when the torque value reaches the predetermined relationship to the reference value.

7. The vehicle lug stud and lug nut monitoring system of claim 3, further comprising a power source in order to supply power to at least some components of the system.

8. The vehicle lug stud and lug nut monitoring system of claim 7, wherein the power source includes a piezoelectric film electrically connected to the at least one measuring sensor and to the radio frequency transmitter in order to supply power thereto.

9. A vehicle lug stud and lug nut monitoring system, comprising:
   a lug stud having a shank;
   a lug nut constructed to fasten on the shank;
   a first sensor carried by the lug stud and a second sensor carried by the lug nut, the first sensor measuring a distance between itself and the second sensor; and
   an indicator communicating with the first sensor to determine a value based on the measured distance, and to alert an operator of the vehicle when the value reaches a predetermined relationship to a reference value.

10. The vehicle lug stud and lug nut monitoring system of claim 9, wherein the reference value is a range of distances that represents a range of acceptable torque values between the lug stud and the lug nut, the range of distances having an upper limit and a lower limit, whereby the indicator alerts the operator when the value is greater than the upper limit or less than the lower limit.

11. A method of monitoring a lug stud and a lug nut on a vehicle wheel, the method comprising:
   measuring a distance between a first sensor carried by the lug stud and a second sensor carried by the lug nut;
   determining a value that is based on the measured distance between the first and second sensors; and
   alerting an operator of the vehicle when the value reaches a predetermined relationship to a reference value.

12. A vehicle lug stud and lug nut monitoring system, comprising:
   a lug stud having a head and an externally threaded shank;
   a lug nut having internal threads to fasten on the shank;
   a first sensor carried by the lug stud and a second sensor carried by the lug nut, at least one of the first and second sensors measuring a relative distance between the first and second sensors;
   a radio frequency transmitter communicating with the at least one measuring sensor to emit a signal in response to the measured relative distance;
   a radio frequency receiver to receive the signal from the radio frequency transmitter;
   a control module communicating with the radio frequency receiver to determine a value that is based on the measured relative distance;
   a display to alert an operator of the vehicle when the value reaches a predetermined relationship to a reference value; and
   a power source to supply power to at least the at least one sensor and the radio frequency transmitter.

* * * * *